United States Patent
(12) United States Patent
Lindemann et al.

(10) Patent No.: US 12,706,506 B2
(45) Date of Patent: Aug. 11, 2026

(54) MECHANICAL INTER-LOCK FAIL-SAFE FOR HIGH VOLTAGE CONNECTION

(71) Applicant: Schaeffler Technologies AG & Co. KG, Herzogenaurach (DE)

(72) Inventors: Paul Lindemann, Howard, OH (US); Zachary Gnabah, Massillon, OH (US); Jonathan Getz, Mansfield, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 563 days.

(21) Appl. No.: 18/131,082

(22) Filed: Apr. 5, 2023

(65) Prior Publication Data

US 2024/0339889 A1 Oct. 10, 2024

(51) Int. Cl.
*H02K 5/22* (2006.01)

(52) U.S. Cl.
CPC .................................... *H02K 5/225* (2013.01)

(58) Field of Classification Search
CPC .......... H02K 5/22; H02K 5/225; H01R 13/44; H01R 13/447; H01R 13/453; H01R 13/4532
See application file for complete search history.

(56) References Cited

U.S. PATENT DOCUMENTS

2012/0208404 A1* 8/2012 Matsumoto .......... H01R 13/701 439/661
2022/0311305 A1* 9/2022 Baumgart .............. H02K 11/20

FOREIGN PATENT DOCUMENTS

GB 2566525 A * 3/2019 ........... H01R 13/713

* cited by examiner

*Primary Examiner* — Eric Johnson
(74) *Attorney, Agent, or Firm* — Volpe Koenig

(57) ABSTRACT

A junction box assembly including a housing having an opening for accessing an interior of the housing, a high-voltage connector adjacent the opening, and an access panel mounted to the housing. The access panel is movable between a first position and a second position, the first position restricting access to the opening of the housing and permitting a cooperating high-voltage connector to engage the high-voltage connector adjacent the opening and the second position permitting access to the opening of the housing and restricting a cooperating high-voltage connecter from engaging the high-voltage connector adjacent the opening.

18 Claims, 7 Drawing Sheets

MECHANICAL INTER-LOCK FAIL-SAFE FOR HIGH VOLTAGE CONNECTION

FIELD

The present disclosure relates generally to junction box assemblies. More particularly, the present disclosure relates to a junction box assembly having an access panel.

BACKGROUND

Junction box assemblies are generally well known in electric motor (e-motor) applications. A junction box assembly is generally configured to transfer power from the power electronics unit (PEU) to the e-motor. In a typical configuration, a junction box assembly receives electrical power from a high-voltage cable connected to the junction box assembly by a high-voltage connector.

Some junction box assemblies include a removable access panel for allowing access to an interior of the junction box for repairs. For safety reasons, an interlock switch is typically provided to prevent the flow of current through the junction box assembly when the access panel is removed. Alternatively, some access panels are designed such that they can only be removed following the disconnection of the high-voltage connector. Such access panels, however, do not restrict the ability of the high-voltage connector to be reconnected before the access panel is reinstalled. Thus, the possibility remains that the junction box could be energized while the access panel is removed.

SUMMARY

In accordance with one aspect of the present disclosure, a junction box assembly comprises a housing having an opening for accessing an interior of the housing, and a high-voltage connector adjacent the opening, and an access panel mounted to the housing. The access panel is movable between a first position and a second position, the first position restricting access to the opening of the housing and permitting a cooperating high-voltage connector to engage the high-voltage connector adjacent the opening and the second position permitting access to the opening of the housing and restricting a cooperating high-voltage connecter from engaging the high-voltage connector adjacent the opening.

The access panel can be pivotally mounted to the housing such that the access panel can be rotated between a first orientation corresponding to the first position and a second orientation corresponding to the second position. The access panel can include a generally planar surface and can be pivotable about an axis extending perpendicular to the generally planar surface. In one example, a shoulder bolt extends through the access panel and is received in the housing, and the access panel is pivotable about the shoulder bolt between the first and second positions. An exposed shank portion of the shoulder bolt can have an axial length that is greater than a thickness of the access panel such that the access panel can be separated from the housing prior to and during rotation between the first and second positions. The shoulder bolt can be permanently installed in the housing. The access panel can be fixed to the housing in both the first and second positions.

In another example, the housing can include first and second slots extending along opposite sides of the opening, the slots configured to receive laterally extending portions of the access panel for sliding movement of the access panel between the first and second positions. The slots can be formed in the housing, and can include a horizontal portion and at least two vertical portions, whereby the access panel can be displaced and spaced apart from a portion of the housing surrounding the opening. The slots can be formed by rails mounted to the housing on opposite sides of the opening, each rail forming a slot with a surface of the housing. The slots can have a thickness that is greater than a thickness of the laterally extending portions of the access panel received therein, whereby the access panel can be displaced and spaced apart from a portion of the housing surrounding the opening. The access panel can have a rectangular shape with each laterally extending protrusion extending from an opposite parallel side of the access panel.

In accordance with another aspect of the present disclosure, a junction box assembly comprises a housing having an opening for accessing an interior of the housing, and a high-voltage connector adjacent the opening, and an access panel mounted to the housing. The housing includes first and second slots extending along opposite sides of the opening, the slots configured to receive laterally extending portions of the access panel for sliding movement of the access panel between a first position restricting access to the opening of the housing and a second position permitting access to the opening of the housing.

The first position can be configured to permit a cooperating high-voltage connector to engage the high-voltage connector adjacent the opening and the second position can be configured to restrict the cooperating high-voltage connector from engaging the high-voltage connector adjacent the opening. The slots can be formed by rails mounted to the housing on opposite sides of the opening, each rail forming a slot with a surface of the housing. The slots can have a thickness that is greater than a thickness of the laterally extending portions of the access panel received therein.

In accordance with another aspect of the present disclosure, a method of accessing an interior of a junction box assembly is set forth. The method comprises providing a junction box assembly having a housing with an opening for accessing the interior of the housing, an access panel for selectively closing the opening, and a high-voltage connector adjacent the opening, disconnecting a high-voltage cable from the high voltage connector, and moving the access panel from a first position to a second position, the first position restricting access to the opening of the housing and permitting a cooperating high-voltage connector to engage the high-voltage connector adjacent the opening and the second position permitting access to the opening of the housing and restricting a cooperating high-voltage connecter from engaging the high-voltage connector adjacent the opening.

Additional embodiments are disclosed herein.

BRIEF DESCRIPTION OF THE DRAWINGS

The foregoing Summary and the following Detailed Description will be better understood when read in conjunction with the appended drawings, which illustrate an embodiment of the disclosure. In the drawings.

DETAILED DESCRIPTION

Figure 1:
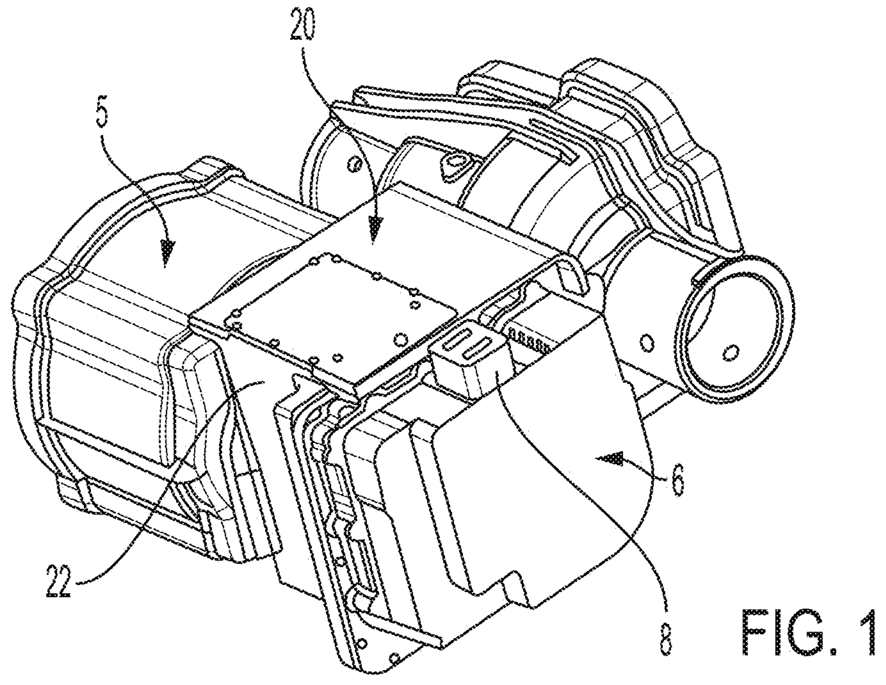
FIG. 1 is a perspective view of an e-motor assembly including an exemplary junction box assembly having an access panel in a closed position in accordance with the present disclosure.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. This terminology includes the words specifically noted above, derivatives thereof and words of similar import.

Figure 3:
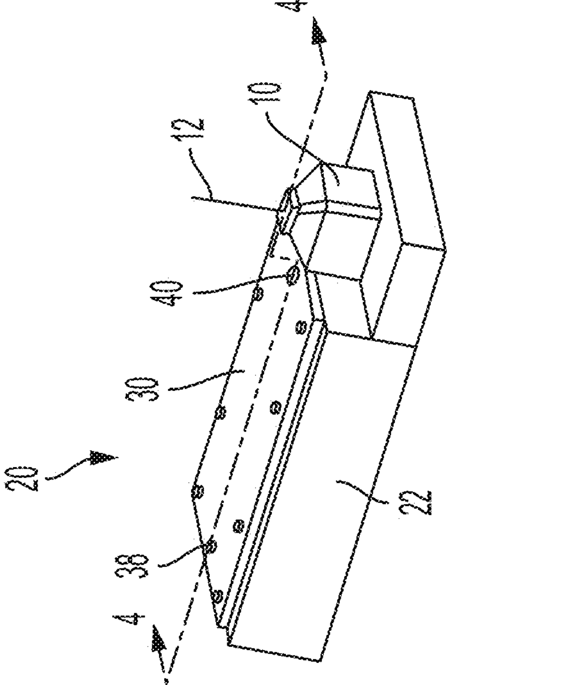
FIG. 3 is a perspective view of an exemplary junction box assembly including an access panel in a closed position in accordance with the present disclosure.

Referring to FIG. 1, an assembly is disclosed that includes an e-motor 5 and a PEU 6. The PEU 6 includes a high-voltage connector 8 adapted to couple with a mating connector 10 of a high-voltage cable 12 (see FIG. 3, for example) to receive electrical power. The PEU 6 supplies electrical power to the e-motor 5 via a junction box assembly 20.

The junction box assembly 20 includes a housing 22 enclosing various components such as bus bars 26 and other components for electrically coupling the PEU 6 with the e-motor 5. An access panel 30 is provided for accessing an interior of the housing 22 of the junction box assembly 20. The access panel 30 is selectively movable between a first position closing an opening 34 in the housing 22 and a second position exposing the opening 34 in the housing 22.

Figure 2:
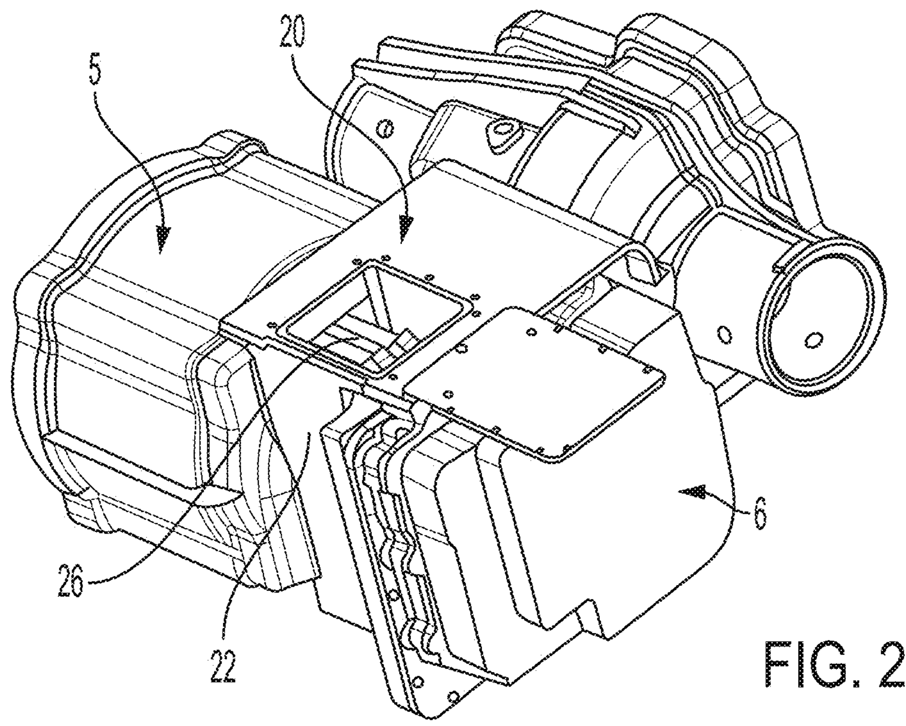
FIG. 2 is a perspective view of the e-motor assembly of FIG. 1 with the access panel in an open position.

Additional reference is now made to FIGS. 3-6 wherein the junction box assembly 20 of FIGS. 1 and 2 is shown in isolation and in schematic form. In the first (closed) position of the access panel 30 shown in FIGS. 3 and 4, the access panel 30 covers the opening 34 and is secured in place with a plurality of fasteners 38. In this position, access to the interior of the housing 22 of the junction assembly 20 is blocked and the mating high voltage connectors 8 and 10 can be coupled together, as shown. Accordingly, electrical power can be supplied to the PEU 6, junction box assembly 20 and e-motor 5.

Figure 6:
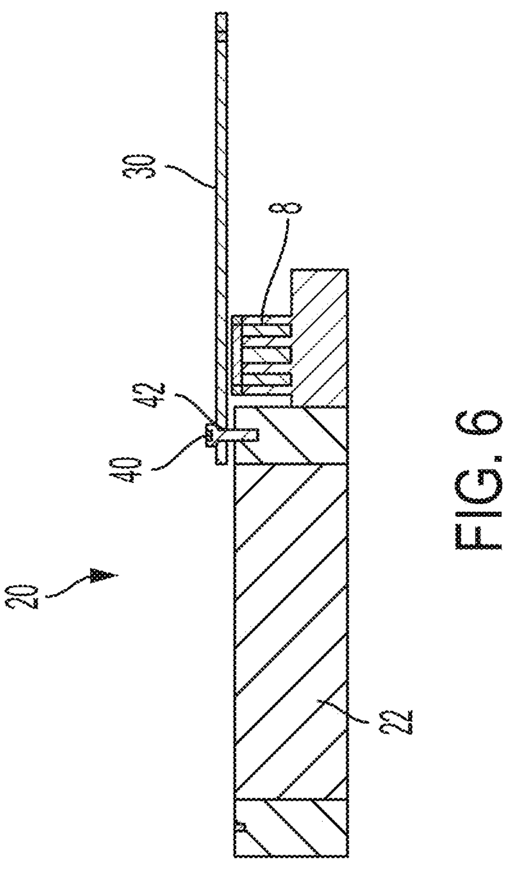
FIG. 6 is a cross-sectional view of the junction box assembly taken along the line 6-6 in FIG. 5.
Figure 5:
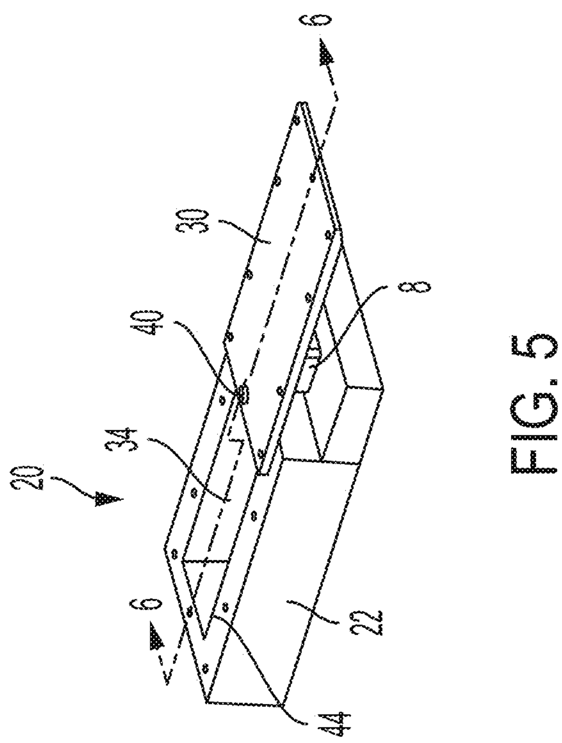
FIG. 5 is a perspective view of the exemplary junction box assembly of FIG. 3 with the access panel in an open position.

In the second (open) position of the access panel 30 shown in FIGS. 5 and 6, the access panel 30 is rotated about a shoulder bolt 40 to expose the opening 34 in the housing 22 and block the high-voltage connector 8. It will be appreciated that the mating high voltage connectors 8 and 10 must be disconnected prior to rotation of the access panel 30 about the shoulder bolt 40. Further, the access panel 30 in the second (open) position blocks the connector 8 such that connection with mating connector 10 is restricted. As such, the access panel 30 prevents electrical power from being supplied to the junction box assembly 20 when the interior of the housing 22 is accessible via opening 34.

Figure 4:
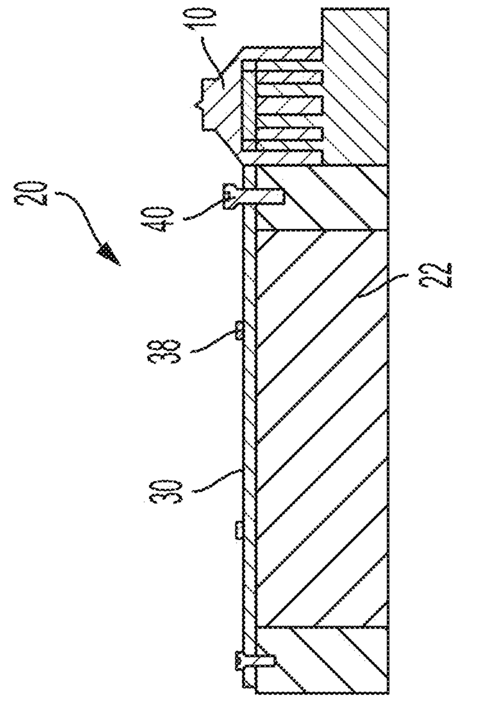
FIG. 4 is a cross-sectional view of the junction box assembly taken along the line 4-4 in FIG. 3.

In FIG. 4, it can be seen that the access panel 30 in the closed position abuts the connector 10. Upon attempted rotation of the access panel 30 about the shoulder bolt 40 with the connector 10 connected, the access panel 30 is immediately restricted through interference with the connector 10. In other embodiments, the access panel 30 may be spaced from the connector 10 such that partial rotation of the access panel 30 is possible. In such cases, the amount of rotation of the access panel 30 would typically be minimal such that access to the interior of the housing 22 is not practical unless the connector 10 is disconnected.

It should be appreciated that junction box assemblies are typically provided with seals to prevent contaminants from entering the interior of the housing 22. In the illustrated embodiment, a seal 44 is supported in the housing 22 surrounding the opening 34. When the access panel 30 is in the closed position, the seal 44 prevents contaminants from entering the housing 22 via the opening 34. To ensure proper sealing of the access cover 30 with the housing 22, the shoulder bolt 40 is dimensioned to allow the access panel 30 to be shifted axially-upward along a shank portion 42 of the shoulder bolt such that the access panel 30 can be lifted slightly off the housing 22 prior to rotation.

By lifting the access panel 30 prior to rotation, the seal 44 is not subjected to shearing forces that otherwise could damage the seal 44 on rotation of the access panel 30. Further, upon rotation of the access panel 30 back to the closed position, the access panel 30 can first be positioned in the closed orientation and then vertically displaced into engagement with the seal 44 and housing 22. Again, by rotating the access panel 30 in a raised configuration the seal 44 can be protected from shearing forces that could damage the seal 44 or displace to seal 44 resulting in poor seal performance. In the illustrated embodiment, the shoulder bolt 40 is dimensioned such that the access panel 30 can be lifted a distance of approximately one-half a thickness of the access panel 30. It should be understood that the shoulder bolt 40 can be dimensioned to allow the access panel 30 to be shifted a greater or less distance, as desired.

The shoulder bolt 40 can be installed in the housing 22 in a manner to prevent or make difficult its removal to prevent tampering. To this end, the shoulder bolt 40 can include an anti-tamper bolt head that requires a special tool for removal and installation. In other embodiments, the shoulder bolt 40 can be permanently installed in the housing 22 with adhesives or the like.

With reference to FIGS. 7-10, another exemplary junction box assembly in accordance with the present disclosure is illustrated and identified generally by reference numeral 120. The junction box assembly 120 includes a housing 122 and an access panel 130 covering an opening 134 in the housing 122. It will be appreciated that the junction box assembly 120 is generally similar to the junction box assembly 20 of FIGS. 1-6 with the exception of the manner in which the access panel 130 is movable between open and closed positions.

In the embodiment of FIGS. 7-10, rails 150 are mounted to the housing 122 and define slots 154 therewith. The rails 150 can be secured to the housing 122 using suitable fasteners, adhesives or other connecting methods, for example. The slots 154 are configured to receive laterally extending protrusions 158 of the access panel 130. The laterally extending protrusions 158 are adapted to permit the access panel 130 to slide within the confines of the slots 154 between open and closed positions, while preventing the access panel 130 from being removed altogether from the junction box assembly 120.

Figure 8:
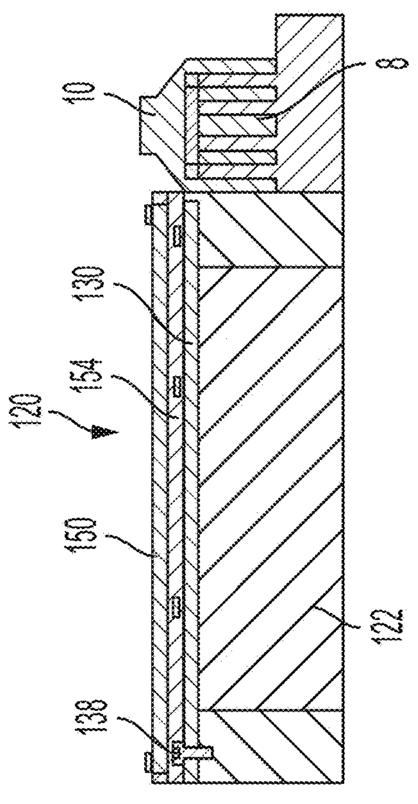
FIG. 8 is a cross-sectional view of the junction box assembly taken along the line 8-8 in FIG. 7.
Figure 7:
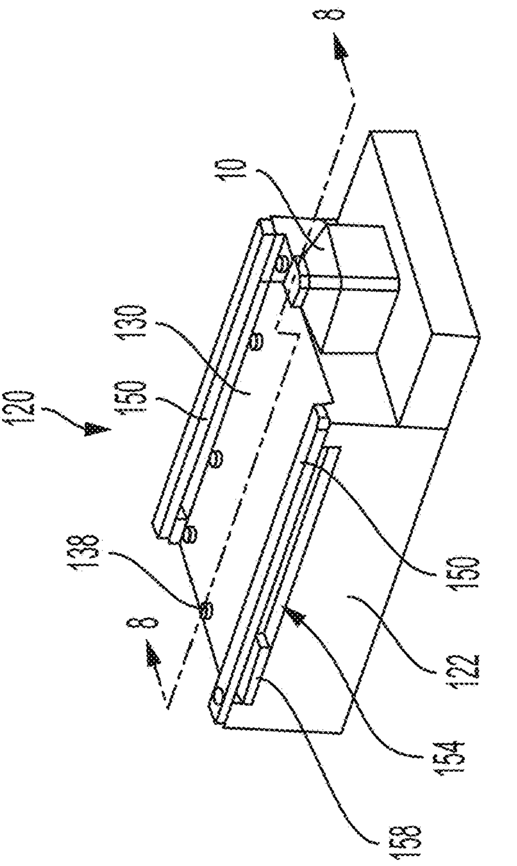
FIG. 7 is a perspective view of another exemplary junction box assembly including an access panel in a closed position in accordance with the present disclosure.

In the first (closed) position of the access panel 130 shown in FIGS. 7 and 8, the access panel 130 covers the opening 134 and is secured in place with a plurality of fasteners 138. In this position, access to the interior of the housing 122 of the junction assembly 120 is blocked and the mating high voltage connectors 8 and 10 can be coupled together, as shown.

Figure 10:
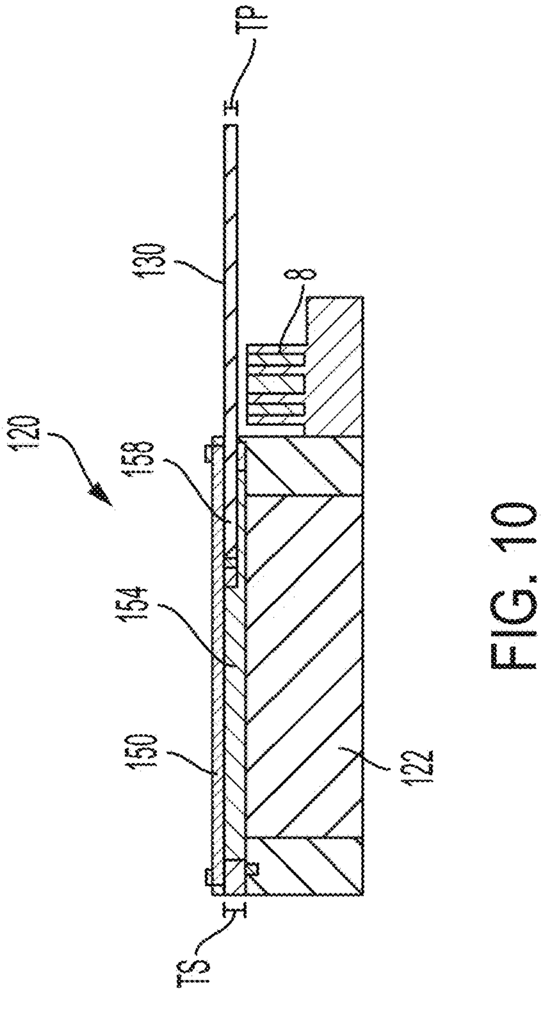
FIG. 10 is a cross-sectional view of the junction box assembly taken along the line 10-10 in FIG. 9.
Figure 9:
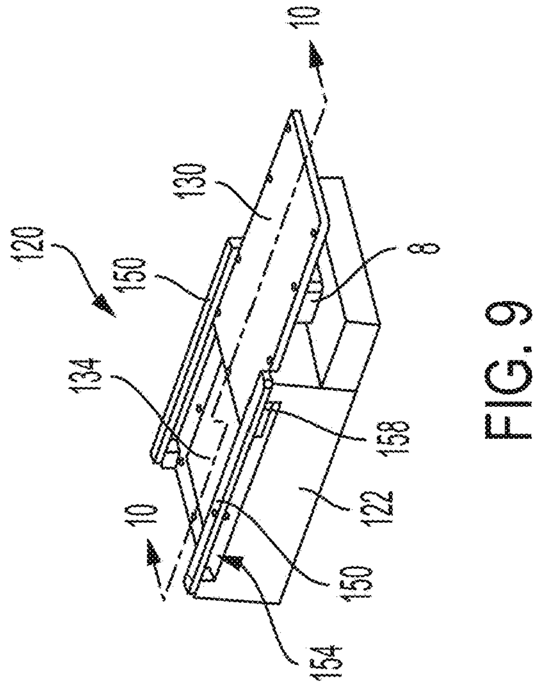
FIG. 9 is a perspective view of the exemplary junction box assembly of FIG. 7 with the access panel in an open position.

In the second (open) position of the access panel 130 shown in FIGS. 9 and 10, the access panel 130 is shifted to expose the opening 134 in the housing 122 and block the high-voltage connector 8. It will be appreciated that the mating high voltage connectors 8 and 10 must be disconnected prior to shifting the access panel 130 to expose the opening 134. Further, the access panel 130 in the second (open) position blocks the connector 8 such that connection with mating connector 10 is restricted. As such, the access panel 130 prevents electrical power from being supplied to the junction box assembly 120 when the interior of the housing 122 is accessible via opening 134.

In FIG. 10, it can be seen that a thickness TP of the laterally extending portions 158 of the access panel 130 is less than a thickness TS of the slots 154. This permits the access panel 130 to be lifted from the housing 122 during movement between the first and second positions to ensure proper unsealing and sealing of the access panel 130 with the housing 122, in much the same way as described above in connection with the exemplary embodiment of FIGS. 1-6.

Referring now to FIGS. 11-14, another exemplary junction box assembly in accordance with the present disclosure is illustrated and identified generally by reference numeral 220. The junction box assembly 220 includes a housing 222 and an access panel 230 covering an opening 234 in the housing 222. It will be appreciated that the junction box assembly 220 is generally similar to the junction box assembly 20 of FIGS. 1-6 with the exception of the manner in which the access panel 230 is movable between open and closed positions.

In the embodiment of FIGS. 11-14, slots 254 are machined, molded or otherwise provided in the housing 222. The slots 254 are configured to receive laterally extending protrusions 258 of the access panel 230. The laterally extending protrusions 258 are adapted to permit the access panel 230 to slide within the confines of the slots 254 between open and closed positions, while preventing the access panel 230 from being removed altogether from the junction box assembly 220.

Figure 12:
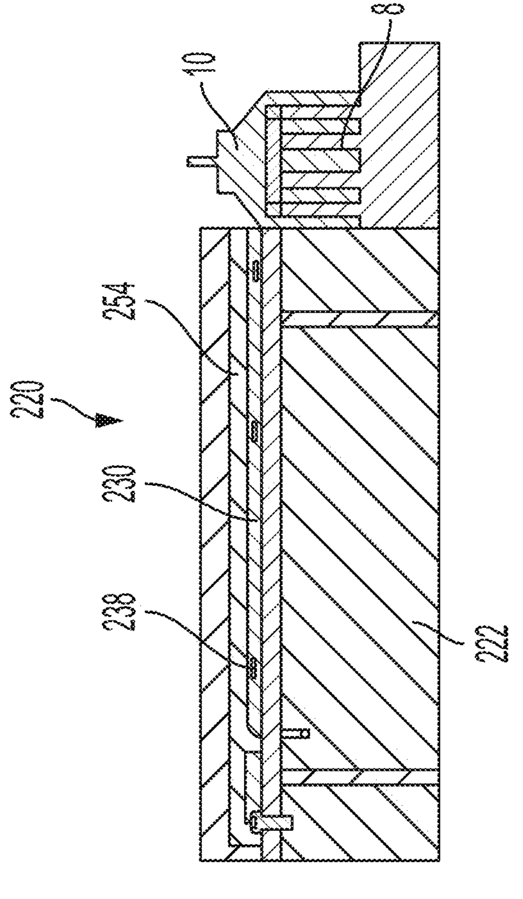
FIG. 12 is a cross-sectional view of the junction box assembly taken along the line 12-12 in FIG. 11.
Figure 11:
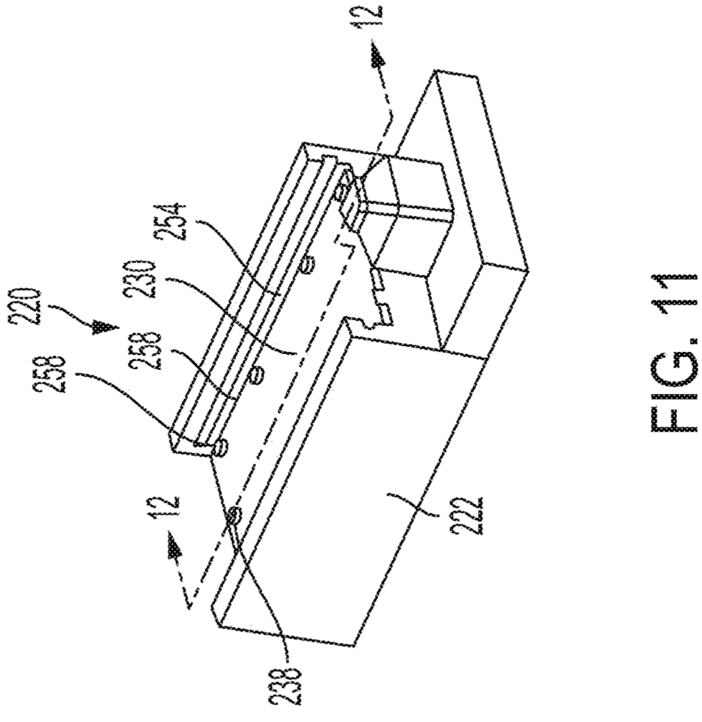
FIG. 11 is a perspective view of another exemplary junction box assembly including an access panel in a closed position in accordance with the present disclosure.

In the first (closed) position of the access panel 230 shown in FIGS. 11 and 12, the access panel 230 covers the opening 234 and is secured in place with a plurality of fasteners 238. In this position, access to the interior of the housing 222 of the junction assembly 220 is blocked and the mating high voltage connectors 8 and 10 can be coupled together, as shown.

Figure 14:
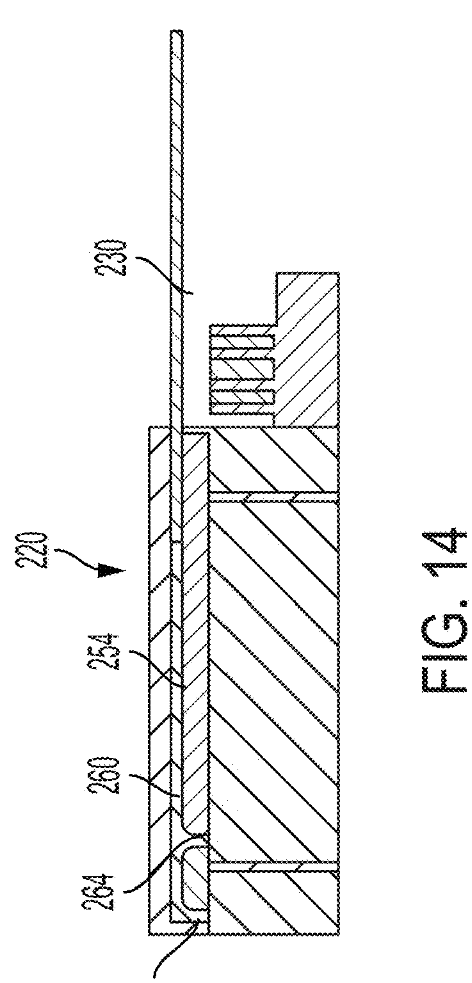
FIG. 14 is a cross-sectional view of the junction box assembly taken along the line 14-14 in FIG. 13.
Figure 13:
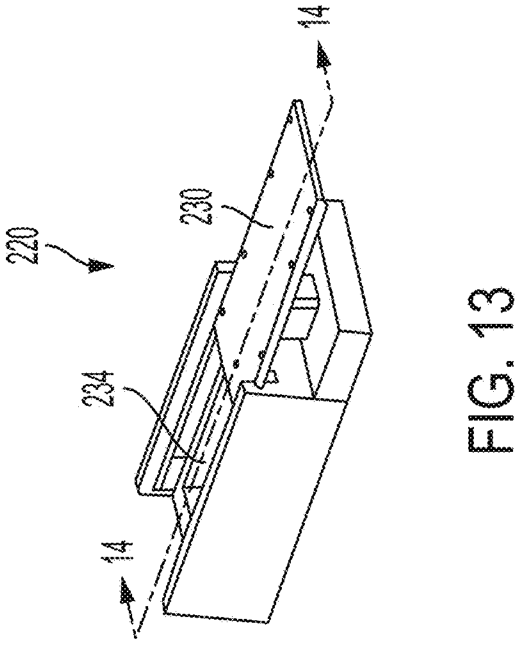
FIG. 13 is a perspective view of the exemplary junction box assembly of FIG. 11 with the access panel in an open position.

In the second (open) position of the access panel 230 shown in FIGS. 13 and 14, the access panel 230 is shifted to expose the opening 234 in the housing 222 and block the high-voltage connector 8. It will be appreciated that the mating high voltage connectors 8 and 10 must be disconnected prior to shifting the access panel 230 to expose the opening 234. Further, the access panel 230 in the second (open) position blocks the connector 8 such that connection with mating connector 10 is restricted. As such, the access panel 230 prevents electrical power from being supplied to the junction box assembly 220 when the interior of the housing 222 is accessible via opening 234.

Each slot 254 includes a horizontal portion 260 and at least two vertical portions 264. It will be appreciated that the laterally extending protrusions 258 of the access panel 230 are adapted to allow vertical displacement of the access panel 230 within the vertical portions 264 of the slots 254 and horizontal translation of the access panel 230 in the horizontal portions 260 of the slots 254. Accordingly, the access panel 230 can be lifted from the housing 222 during movement between the first and second positions to ensure proper unsealing and sealing of the access panel 230 with the housing 222.

Having thus described the present disclosure in detail, it is to be appreciated and will be apparent to those skilled in the art that many physical changes, only a few of which are exemplified in the detailed description of the invention, could be made without altering the concepts and principles embodied therein.

It is also to be appreciated that numerous embodiments incorporating only part of an embodiment are possible which do not alter, with respect to those parts, the concepts and principles embodied therein.

The present embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

LOG OF REFERENCE NUMERALS e-motor 5
PEU 6
high-voltage connector 8
mating connector 10
high-voltage cable 12
junction box assembly 20, 120, 220
a housing 22, 122, 222
access panel 30, 130, 230
opening 34, 134, 234
fasteners 38, 138, 238
shoulder bolt 40
seal 44
rails 150
slots 154, 254
protrusions 158, 258
thickness of the laterally extending portions TP
thickness of the slots TS
horizontal portion 260
vertical portions 264

The invention claimed is:

1. A junction box assembly comprising:

a housing having an opening for accessing an interior of the housing, and a male or female high-voltage connector adjacent the opening; and an access panel mounted to the housing;

wherein the access panel is movable between a first position and a second position, the first position restricting access to the opening of the housing and permitting a cooperating high-voltage connector to engage the male or female high-voltage connector adjacent the opening and the second position permitting access to the opening of the housing and restricting the cooperating high-voltage connector from engaging the male or female high-voltage connector adjacent the opening; and wherein at least a portion of the access panel that covers the opening in the first position extends over the male or female high-voltage connector in the second position.

2. The junction box assembly of claim 1, wherein the access panel is pivotally mounted to the housing such that the access panel can be rotated between a first orientation corresponding to the first position and a second orientation corresponding to the second position.

3. The junction box assembly of claim 2, wherein the access panel includes a generally planar surface and is pivotable about an axis extending perpendicular to the generally planar surface.

4. The junction box assembly of claim 1, wherein the access panel is fixed to the housing in both the first and second positions.

5. The junction box assembly of claim 1, further comprising a plurality of fasteners securing the access panel to the housing.

6. The junction box assembly of claim 1, wherein the housing includes first and second slots extending along opposite sides of the opening, the slots configured to receive laterally extending portions of the access panel for sliding movement of the access panel between the first and second positions.

7. The junction box assembly of claim 6, wherein the slots are formed in the housing.

8. The junction box assembly of claim 7, wherein the slots include a horizontal portion and at least two vertical portions, whereby the access panel can be displaced and spaced apart from a portion of the housing surrounding the opening.

9. The junction box assembly claim 6, wherein the slots are formed by rails mounted to the housing on opposite sides of the opening, each rail forming a slot with a surface of the housing.

10. The junction box assembly of claim 9, wherein the slots have a thickness that is greater than a thickness of the laterally extending portions of the access panel received therein, whereby the access panel can be displaced and spaced apart from a portion of the housing surrounding the opening.

11. The junction box assembly of claim 6, wherein the access panel has a rectangular shape with each laterally extending protrusion extending from an opposite parallel side of the access panel.

12. The junction box assembly of claim 1, wherein the access panel is planar, and wherein the first and second positions of the access panel are coplanar.

13. A junction box assembly comprising:

a housing having an opening for accessing an interior of the housing, and high-voltage connector adjacent the opening; and an access panel mounted to the housing;

wherein the access panel is movable between a first position and a second position, the first position restricting access to the opening of the housing and permitting a cooperating high-voltage connector to engage the high-voltage connector adjacent the opening and the second position permitting access to the opening of the housing and restricting the cooperating high-voltage connector from engaging the high-voltage connector adjacent the opening;

wherein the access panel is pivotally mounted to the housing such that the access panel can be rotated between a first orientation corresponding to the first position and a second orientation corresponding to the second position;

wherein the access panel includes a generally planar surface and is pivotable about an axis extending perpendicular to the generally planar surface; and further comprising a shoulder bolt extending through the access panel and received in the housing, wherein the access panel is pivotable about the shoulder bolt between the first and second positions.

14. The junction box assembly of claim 13, wherein an exposed shank portion of the shoulder bolt has an axial length that is greater than a thickness of the access panel such that the access panel can be separated from the housing prior to and during rotation between the first and second positions.

15. The junction box assembly of claim 14, wherein the exposed shank portion of the shoulder bolt has an axial length of at least twice a thickness of the access panel.

16. The junction box assembly of claim 15, wherein the shoulder bolt is permanently installed in the housing.

17. A method of accessing an interior of a junction box assembly, the method comprising:

providing a junction box assembly having a housing with an opening for accessing the interior of the housing, an access panel for selectively closing the opening, and a male or female high-voltage connector adjacent the opening;

disconnecting a high-voltage cable from the male or female high voltage connector; and moving the access panel from a first position to a second position, the first position restricting access to the opening of the housing and permitting a cooperating high-voltage connector of the high-voltage cable to engage the male or female high-voltage connector adjacent the opening and the second position permitting access to the opening of the housing and restricting the cooperating high-voltage connecter of the high voltage cable from engaging the male or female high-voltage connector adjacent the opening;

wherein at least a portion of the access panel that covers the opening in the first position extends over the male or female high-voltage connector in the second position.

18. The method of claim 17, wherein the access panel is planar, and wherein the first and second positions of the access panel are coplanar.

* * * * *